United States Patent
Heibel et al.

(10) Patent No.: US 11,289,236 B2
(45) Date of Patent: Mar. 29, 2022

(54) COMBINATION REACTOR GAMMA RADIATION POWER HARVESTING REACTOR POWER DISTRIBUTION MEASUREMENT, AND SUPPORT TO COOLANT FREEZING PROTECTION SYSTEM FOR LIQUID METAL AND MOLTEN SALT-COOLED REACTOR SYSTEMS

(71) Applicant: Westinghouse Electric Company LLC, Cranberry Township, PA (US)

(72) Inventors: Michael D. Heibel, Harrison City, PA (US); Paolo Ferroni, Pittsburgh, PA (US); Jorge V. Carvajal, Irwin, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 718 days.

(21) Appl. No.: 16/134,322

(22) Filed: Sep. 18, 2018

(65) Prior Publication Data
US 2019/0385758 A1 Dec. 19, 2019

Related U.S. Application Data

(63) Continuation-in-part of application No. 16/008,202, filed on Jun. 14, 2018.

(51) Int. Cl.
*G21H 1/04* (2006.01)
*G21C 15/28* (2006.01)
(52) U.S. Cl.
CPC .............. *G21H 1/04* (2013.01); *G21C 15/28* (2013.01)

(58) Field of Classification Search
CPC ... G21C 1/00; G21C 1/02; G21C 1/04; G21C 3/40; G21H 1/04
See application file for complete search history.

(56) References Cited

U.S. PATENT DOCUMENTS 3,250,925 A 5/1966 Gumucio et al.
3,547,778 A * 12/1970 Ott ........................... G21D 7/04
376/321

(Continued)

FOREIGN PATENT DOCUMENTS

| EP | 3097567 B1 | 4/2018 |
| JP | 2017501397 A | 1/2017 |
| WO | 2020046428 A2 | 3/2020 |

OTHER PUBLICATIONS

International Search Report and Written Opinion for International PCT Application No. PCT/US2019/028439, dated Mar. 24, 2020.

(Continued)

*Primary Examiner* — Lily C Garner
(74) *Attorney, Agent, or Firm* — K&L Gates LLP

(57) ABSTRACT

In a panel that uses the gamma radiation emitted by fission to produce electrical power, a source of an electrical current is connected to a layer of the panel made of a metal with a relatively high atomic number (Z) that forms an electron emitter. The emitter layer is surrounded by an insulation layer which in turn is surrounded by a relatively low Z value layer for collecting electrons from the emitter. Another layer of insulation and an outer sheath surround the collector. The improved panel may be used for reactor power level and power distribution measurements, and for initiating, maintaining or returning molten salt or metal coolants in the liquid state.

14 Claims, 4 Drawing Sheets

(56) References Cited

U.S. PATENT DOCUMENTS

| | | | | |
|---|---|---|---|---|
| 3,678,920 | A | * | 7/1972 | Cohen .................... G21H 1/00 |
| | | | | 126/344 |
| 5,672,928 | A | | 9/1997 | Terhune |
| 5,861,701 | A | * | 1/1999 | Young .................... G21H 1/04 |
| | | | | 310/305 |
| 8,860,553 | B2 | | 10/2014 | Lal et al. |
| 9,640,290 | B2 | * | 5/2017 | Heibel .................... G21C 9/00 |
| 10,109,380 | B2 | * | 10/2018 | Heibel ............... H01J 47/1233 |
| 10,438,708 | B2 | * | 10/2019 | Heibel ................ G21C 17/102 |
| 2013/0083879 | A1 | | 4/2013 | Heibel et al. |
| 2016/0148712 | A1 | * | 5/2016 | Sandquist ............... G21G 1/06 |
| | | | | 376/158 |
| 2018/0308601 | A1 | * | 10/2018 | Diggins ......... H01L 31/035281 |
| 2019/0392961 | A1 | * | 12/2019 | Choi ...................... G21G 1/12 |

OTHER PUBLICATIONS

International Preliminary Report on Patentability for International PCT Application No. PCT/US2019/028439, dated Dec. 15, 2020.

* cited by examiner

COMBINATION REACTOR GAMMA RADIATION POWER HARVESTING REACTOR POWER DISTRIBUTION MEASUREMENT, AND SUPPORT TO COOLANT FREEZING PROTECTION SYSTEM FOR LIQUID METAL AND MOLTEN SALT-COOLED REACTOR SYSTEMS

BACKGROUND

1. Field

This invention pertains in general to nuclear powered electrical generation systems, and more particularly to a method and apparatus for passively enhancing energy production in a nuclear reactor.

2. Related Art

Nuclear powered electrical generation systems convert the heat generated in a nuclear reactor to a high-enthalpy content fluid, generally steam, which is used to drive turbine generators for the production of electricity in the form of alternating current. The alternating electric current is transmitted to an electrical distribution network and used to provide electrical power to consumers and industries. Light water reactors are currently the most widely used nuclear technology. Light water reactors, however, convert only about 30% of the total energy released by fission into usable electrical power. The reason for such a low efficiency stems from thermodynamic efficiency limitations imposed by the energy conversion path inherent in current reactor designs, i.e., thermal energy to mechanical energy, and by energy losses during the thermodynamic and mechanical energy conversions characterizing such a path. This low efficiency has a detrimental effect on the cost of the electrical power generated by existing nuclear power plants. A novel approach to harvesting gamma radiation energy to improve the efficiency of nuclear power is described in co-pending U.S. patent application Ser. No. 16/008,202 filed Jun. 14, 2018.

In reactors designed to use liquid metal or molten salt as the coolant, there is a need to ensure that the coolant is able to circulate when the reactor is in operation. As these coolants generally have melting points much higher than water, this need requires methods to ensure the coolant is in a liquid state during any operating condition. Under normal operation and normal shutdown conditions, the heat from the reactor's core, including decay heat, is used to maintain the coolant in a liquid state. When the core is fresh and no decay heat is generated or when a system perturbation causes primary coolant overcooling in regions away from the core, such as near the steam generators (or 'heat exchangers' should the power conversion fluid not be water), active methods for heating (such as trace heaters, secondary fluids or hot gases) can be used to ensure a constant liquid coolant. Because of the importance of having a liquid coolant around the reactor core in all stages of the reactor life, all reactors would benefit from diversification of heating sources.

Nuclear power plant operations are designed to be monitored constantly. However, the characteristics of certain reactor types, such as a high irradiation field in the core, challenges the lifetime of conventional in-core instrumentation. Other characteristics, such as the typically large volume of pool-type reactors, challenge the ability to obtain detailed reactor power level and power distribution information.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawing, and abstract as a whole.

Described herein is an improved gamma radiation harvesting power panel that provides the means to both support coolant heating and generate detailed reactor power levels and power distribution information, with a single passive technology.

A system is described that is capable of passively converting gamma radiation product produced inside light water, liquid metal and molten salt cooled reactor systems into useable electric power. In various aspects, the system also may be used to measure electric power distribution in the reactor to continuously measure the reactor power level and distribution within the reactor. In various aspects, the improved gamma energy collection hardware may be used to add heat to the coolant to place it in, keep it in, or return it to, a liquid state.

An apparatus is described herein that, in various aspects includes an outer sheathing made of a low atomic number (Z) metal, an electron generator made of a high Z metal disposed within the sheathing and forming an emitter, a positive output pin extending from the emitter through the sheathing, an electron charge collector made of a low Z metal, disposed between the emitter and the sheathing, a negative output pin extending from the collector through the sheathing, spaced and electrically insulated from the positive output pin, a first layer of insulating material positioned between the sheathing and the collector and a second layer of insulating material positioned between the emitter and the collector, and an electrical current source extending into the emitter. The apparatus may be positioned adjacent an interior wall of a core of a nuclear reactor for housing at least fuel rods and coolant for generating heat sufficient to liquefy the coolant.

Any suitable known source of direct electrical current may be used as the current source. For example, the electrical current source may be a battery. In various aspects, the electrical current source may be a generator. The high Z metal may be selected from tungsten, platinum, gold, cadmium, and lead. The low Z metal may be selected from one of an inconel alloy or a steel alloy. The first and second layers of insulation may be selected from one of aluminum-oxide or magnesium oxide.

In various aspects, the apparatus forms a panel having front and back sides and opposing edges. The front and back sides are greater in width than the edges. The panel may be flat with the edges perpendicular to the front and back sides. In various aspects, the emitter is positioned in the center of the panel, surrounded on each of the front and back sides and edges by the second insulating material, which is surrounded on each of the front and back sides and edges by the collector, which is surrounded on each of the front and back sides and edges by the first insulating layer, which is surrounded on each of the front and back sides and edges by the outer sheath.

In certain aspects, a plurality of panels may be positioned in axial alignment along the length of the core of a nuclear reactor for measuring the relative power distribution in the core. There may be a plurality of panels positioned circumferentially around the interior of the core, and in various aspects, the plurality of panels may be positioned both circumferentially and axially around the interior and along the length of the core.

In certain aspects, the panels may be supported on at least one wall of a fuel assembly cell of a modular fuel rack, and in certain aspects, each wall of the fuel assembly cells of the modular fuel rack may support one such panel.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

Figure 1:
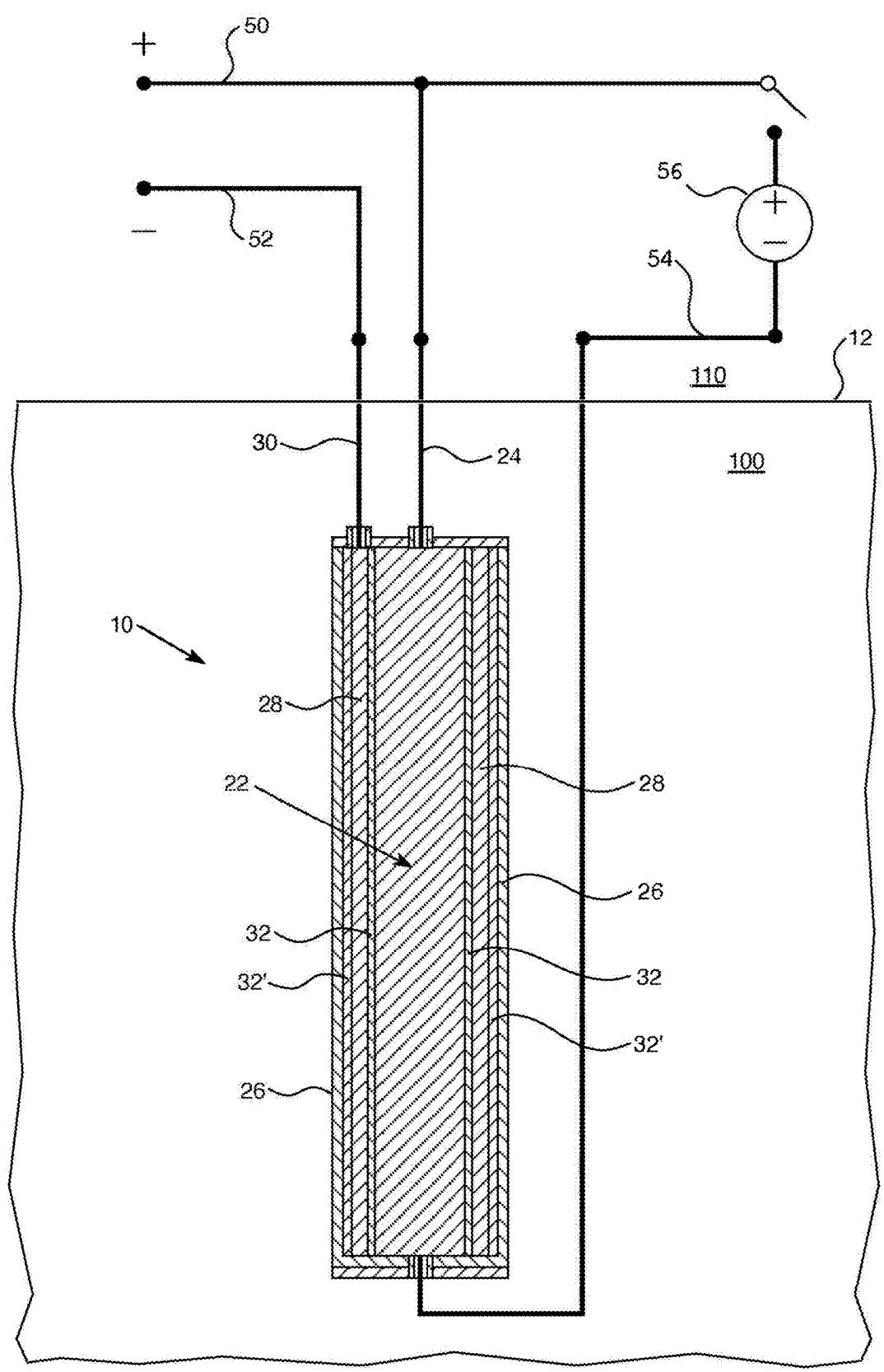
FIG. 1 is a schematic representation of an embodiment of a gamma radiation harvesting power panel with an embodiment of an electric heater circuit.

FIG. 1 shows a schematic representation of an embodiment of an improved electron generating panel for harvesting gamma radiation and its associated electrical and heating circuits. The electron generating panel, also referred to as a gamma harvesting panel 10 includes in various aspects, a central emitter 22 formed from a high atomic number (Z) material that is preferably adjacent to and in contact with, and in various aspects may be surrounded on all sides by, an inner layer of high temperature electrical insulation 32. The emitter material in various aspects is chosen from a material having a high Z number, a melting point greater than 500° F., and preferably greater than 700° F., and a low neutron absorption cross-section. Suitable materials include, for example, tungsten, platinum, gold, and cadmium. Lead may also be used but lead has a relatively low melting point so may not be practical in most applications. The insulation 32 may be made of aluminum-oxide, and in designs where lead is used as the emitter material, magnesium oxide. Adjacent to an in contact with the inner layer of insulation 32, in various aspects, on all sides of the emitter 22, is a charge collector 28, formed from a low atomic number (Z) material, such as an inconel alloy or a steel alloy. The charge collector 28 is adjacent to and in contact with, and in various aspects, surrounded on all sides by, an outer layer of electrical insulation 32', also made of aluminum-oxide, or in certain aspects, magnesium oxide. An outer sheath 26 surrounds the outer insulation 32' and forms an outer housing for the entire gamma radiation harvesting panel 10. In various aspects, the outer sheath 26 is formed from any suitable low Z metal. The low Z metal will be one with an atomic number lower than the high Z metal of the emitter 22.

The emitter 22 has a positive output pin 24 that extends through and is electrically insulated from sheath 26. A negative output pin 30 extends from the collector 28 through outer sheath 26 and is electrically insulated from the outer sheath 26. The positive and negative output pins 24 and 30 extend from the inside 100 of the reactor vessel 12 to the exterior 110 of the vessel 12 to positive and negative gamma electric power collection terminals 50 and 52, respectively.

The arrangement provided on FIG. 1 includes a novel addition of an electrical conduction or heater system 54 that allows external current to flow into and through the emitter 22 portion of the gamma radiation harvesting panel 10. The system 54 provides a source of current 56 to the emitter 22. The source of current 56 may be any suitable source of current, such as a battery, a generator, or a direct current source external to the reactor vessel 12. In use, the current flow will generate heat in the emitter 22 that will radiate through the emitter 22 and the inner layer of insulation 32 to the collector 28. If the emitter 22 material is a material like tungsten, a great deal of heat can be produced without concerns of the emitter 22 material melting. The heat will then be transferred to the coolant material, such as molten salt or metal that surrounds the gamma radiation harvesting panel 10 to liquefy the coolant, for example, by initially generating a liquid state, maintaining the coolant in a liquid state, or returning the coolant to a liquid state. While particularly useful with as molten salt or liquid metal cooled reactors, the gamma radiation harvesting panel 10 with its electrical conduction system 54 may also be used with water cooled reactors.

In various aspects, the panel 10 has front and back sides (not shown in the cross-sectional figures) and opposing edges. The front and back sides are greater in width than the edges. The panel 10 may be flat with the edges perpendicular to the front and back sides. In various aspects, the emitter 22 is positioned in the center of the panel 10, surrounded on each of the front and back sides and edges by the inner layer of insulating material 32, which is surrounded on each of the front and back sides and edges by the collector 28, which is surrounded on each of the front and back sides and edges by the outer insulating layer 32', which is surrounded on each of the front and back sides and edges by the outer sheath 26.

Figure 2:
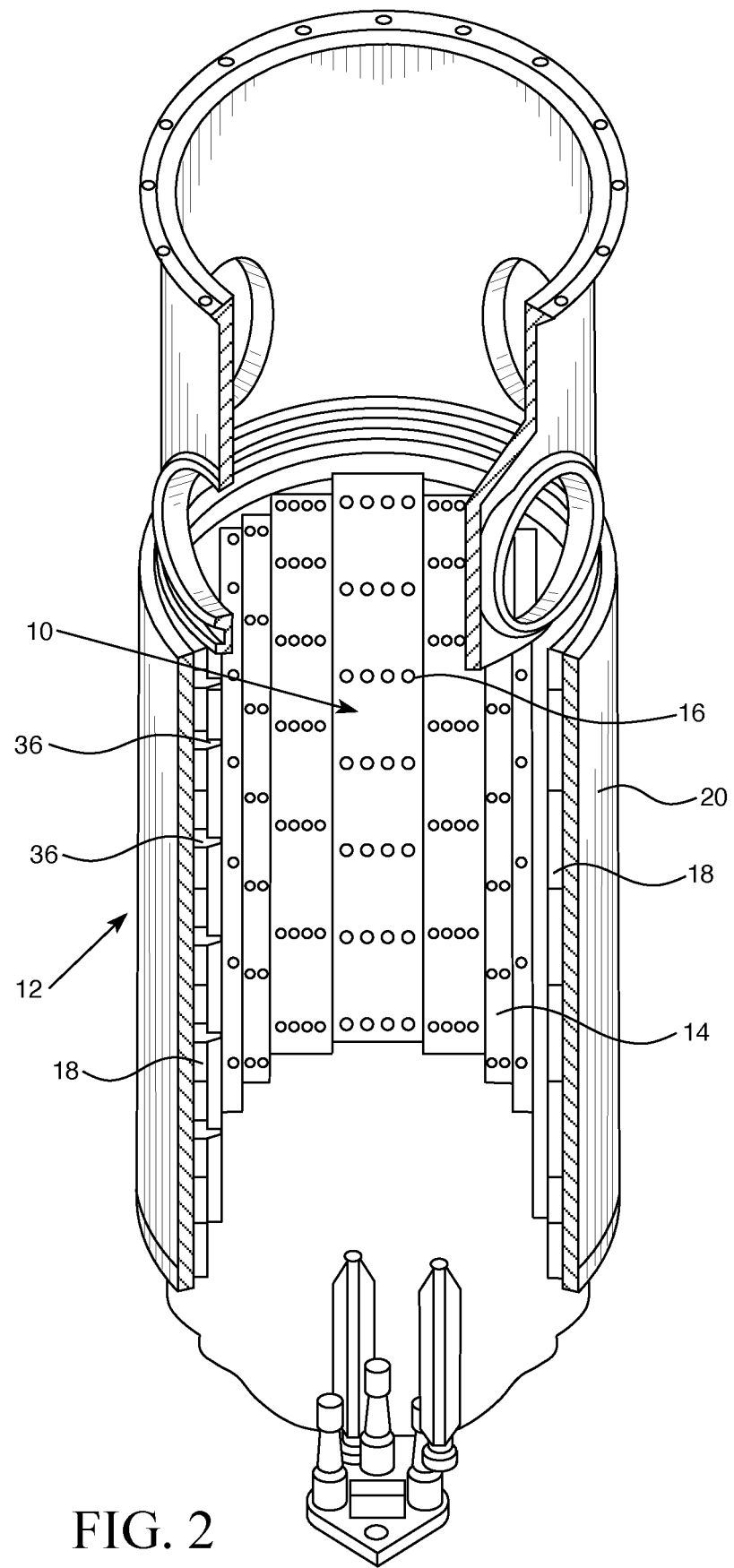
FIG. 2 is a schematic view of a reactor vessel with portions cut away to show the arrangement of the gamma radiation harvesting panel of FIG. 1, baffle, and former components in the reactor core housing.

FIG. 2 shows a cutaway of a reactor vessel 12 with a gamma harvesting panel 10 bolted to a baffle 14 using the bolt penetrations 16 that connect the baffle 14 to the former hardware 18 inside the reactor vessel 12. The baffle-former hardware is used to transition from the inner circular surface of the core 20 of the reactor vessel 12 to the stepped perimeter of the peripheral fuel assemblies (not shown) in the core 20. This arrangement enables ease of removal of the gamma harvesting panels 10 during baffle 14 inspections or reactor decommissioning. The gamma harvesting panels 10 are attached to the baffle plates 14 using two insulated bolt penetration metal cylinders 36 constructed from the same material as the baffle bolts 14, such as stainless steel, and spaced along the gamma harvesting panel 10. The cylinders 36 function as attachment sleeves that have an insulation, such as aluminum oxide, interposed between the sleeve and the gamma harvesting panel 10. In certain aspects, the gamma radiation harvesting panels 10 may replace baffles 14 in the core design.

Figure 4:
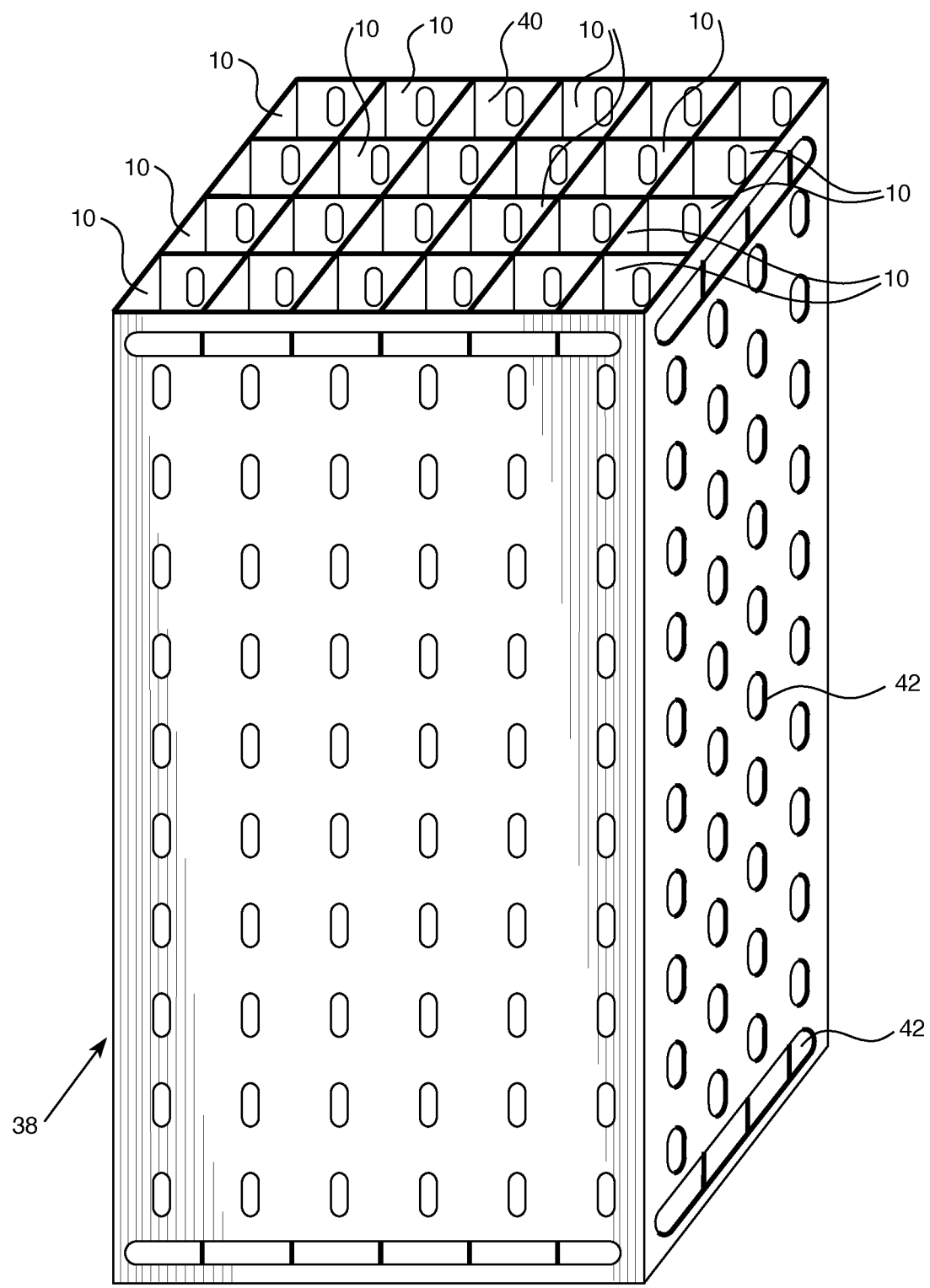

When in use, gamma radiation emitted during the fission process and from the resulting unstable fission byproducts produces Compton and photoelectrical electrons in the thin (~0.1 mm) layer of the emitter 22 located on the outside of the reactor baffle plates 14, or around the faces of the fuel assembly enclosures shown in FIG. 4. The electrons that have sufficient energy to penetrate the thin (~0.1 mm) cylindrical layer of aluminum-oxide insulation 32 that surround the emitter layer 22 will be stopped in the collector 28 adjacent to the inner insulation layer 32. This creates a substantial voltage difference between the emitter layer 22 and the collector layer 28. This voltage difference may be used to produce significant electric power both during reactor operation and with the reactor shutdown.

Essentially all of the gamma radiation from fission events and from unstable fission products exits the fuel pellet volume. Most of the gamma radiation will ionize the atoms in the gamma radiation harvesting panel 10 that surround the reactor 12 through Compton or photoelectrical interactions. The Compton and photoelectrical interactions will produce large numbers of electrons with kinetic energy high enough to penetrate the insulating material 32 positioned between the gamma harvesting panel emitter 22 and collector 28. The net result of this process is that the collector material has a large net negative charge and the emitter material has a large net positive charge. This produces a large voltage difference between the positive and negative output pins 24 and 30 that may be used to produce an electric current that will be transferred to the power collection terminals 50 and 52 and can be used to generate a useful amount of electric power. Measured performance data from tungsten self-powered detector elements demonstrate that hundreds of kilowatts to megawatts of electric power can be generated. The addition of electrical conduction system 54 adds more current to emitter 22, and as described above, generates heat that will be transferred to the coolant material that surrounds the gamma radiation harvesting panel 10.

Figure 3:
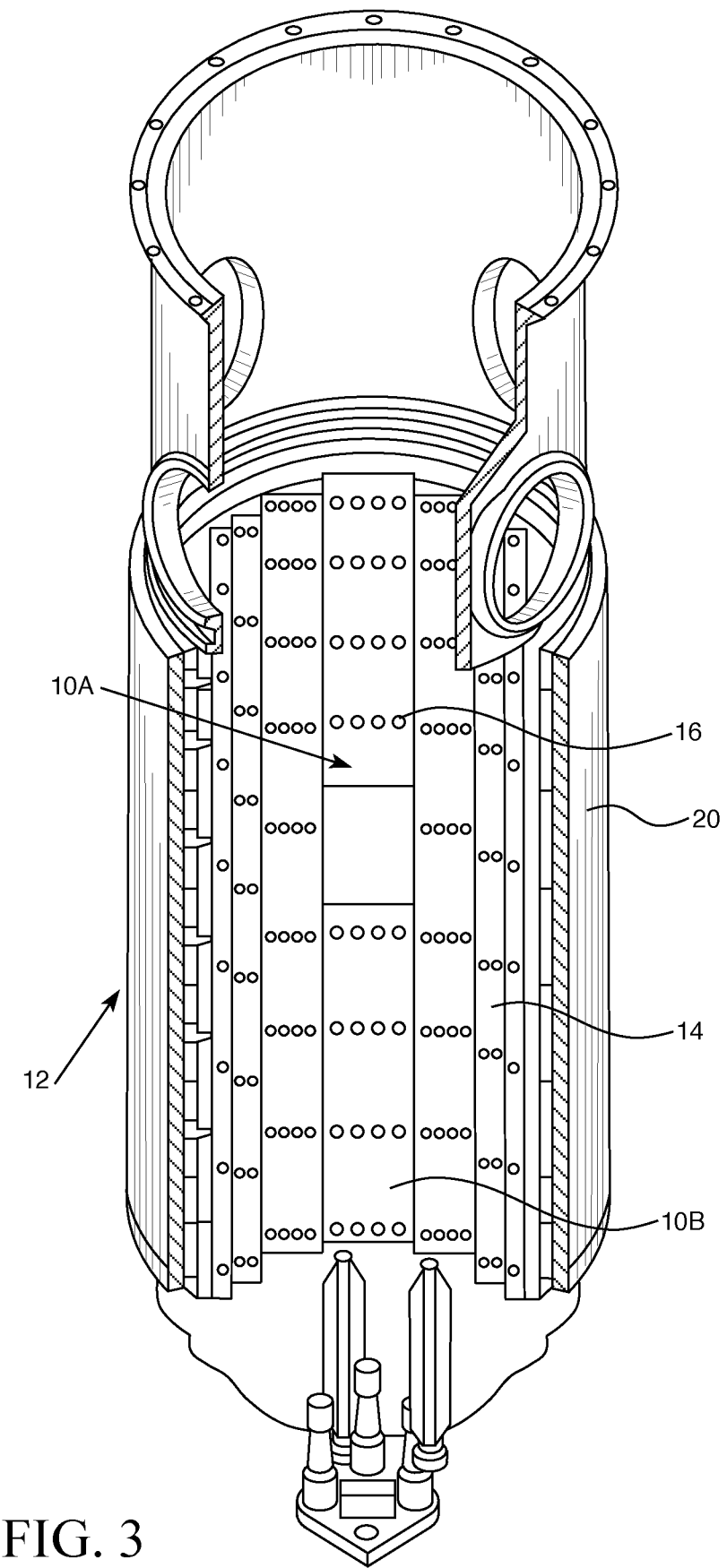
FIG. 3 is a schematic view of the reactor vessel of FIG. 2 with an embodiment of top and bottom axially arranged gamma radiation harvesting power panel of FIG. 1; and, FIG. 4 is a perspective view of a modular fuel assembly using an embodiment of double sided gamma harvesting panels of FIG. 1 as cell wall inserts.

When external electric current is not being supplied to the gamma radiation harvesting panel 10 by electrical conduction system 54, the amount of electric current produced by the gamma radiation harvested by panel 10 may be used to determine the amount of fission power being produced adjacent to the surfaces of the gamma radiation harvesting panel 10. In certain aspects, as illustrated in FIG. 3, the power distribution within the reactor 12 may be continuously measured by surrounding the reactor core 20 with sections of the modified gamma radiation harvesting panels 10A and 10B at different axial positions along the length of the interior surface of the core 20, for example, at the top and bottom of the core 20. The number of axially aligned panels 10 is not limited to top and bottom panels. Additional panels 10 and different alignment configurations may be used.

FIG. 4 shows a lattice layout structure 38 forming modular cells 40, each of which may surround and containing a fuel assembly, typically comprised of 17×17 fuel rods (not shown). The walls of the lattice cells 40 in the structure 38 may be constructed of the dual-sided gamma harvesting panels 10 shown in FIG. 1 or the panels 10 may be mounted to one or more of the cell walls. Flow vents 42 are provided in the walls of each of the cells 40 to facilitate coolant flow. Each of the cells 40 is sized to accept a fuel assembly. Significant useful electric power can be obtained in any of these applications. This configuration may also be made integral to the "can" surrounding boiling water reactor fuel pins in a boiling water reactor fuel assembly (not shown).

In certain aspects, as illustrated in FIG. 4, the power distribution within the reactor may be continuously measured by surrounding individual fuel assemblies with axially arranged sections of the modified gamma radiation harvesting panels 10 similar to the axially arranged sections shown in FIG. 3.

In either the arrangement shown in FIG. 3 or the arrangement shown in FIG. 4, any difference in current measured between the different axially positioned panels 10, each with its associated positive and negative output pins 24 and 30, will demonstrate differences in the distribution of gamma radiation being harvested along the length of the reactor core 20 or fuel assembly. For example, the current measured from the top gamma radiation harvesting panels 10 will be proportional to the current generated in the top portion of the core 20. The current measured from the bottom gamma radiation harvesting panels 10 will be proportional to the current generated in the bottom portion of the core 20. The top and bottom measurements can be used to calculate the distribution of power within the core 20. The top and bottom measurements would be added to obtain the total current generated and the relative proportional distribution between the top and bottom portions of the core 20 calculated.

In various aspects, the current output from the modified gamma radiation harvesting panel 10 elements may be used to provide supplementary power to the heater power supply. For example, the power generated by the gamma radiation harvesting panels 10 may be used during reactor operation to charge and maintain dedicated heater batteries (not shown). Heaters and heater batteries are well known to those skilled in the art. The positioning of the modified gamma radiation harvesting panels 10 can be established to optimize the application of heat to the coolant under a range of important operating situations. The electric current collection and heater control circuitry can be located outside the coolant. The cables necessary to operate the system can be routed out through existing mechanical penetrations such as rod drive mechanisms typical of reactor designs. This approach will greatly simplify the nuclear monitoring and coolant temperature control systems.

The improved gamma radiation harvesting panel with electrical conduction system 54 enables reactor power level and power distribution measurements, as well as maintaining the liquid state of molten salt or metal coolants. The system will allow gamma radiation produced by nuclear fission and fission products to produce additional electric power that may be used to supplement the system power requirements.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An apparatus comprising:
   an outer sheathing of a first metal;
   an electron generator comprising a second metal disposed within the sheathing and forming an emitter;
   a positive output pin extending from the emitter through the sheathing;
   an electron charge collector comprising a third metal disposed between the emitter and the sheathing;
   a negative output pin extending from the collector through the sheathing, spaced and electrically insulated from the positive output pin;
   a first layer of insulating material positioned between the sheathing and the collector and a second layer of insulating material positioned between the emitter and the collector;
   wherein the emitter is coupled to a current source, the current source configured to provide current flow to the emitter;
   wherein the first metal has an atomic number lower than an atomic number of the second metal; and
   wherein the third metal has an atomic number lower than the atomic number of the second metal.

2. The apparatus recited in claim 1 wherein the current source is a battery.

3. The apparatus recited in claim 1 wherein the current source is a generator.

4. The apparatus recited in claim 1 wherein the current source is located external to a nuclear reactor vessel comprising the apparatus.

5. The apparatus recited in claim 1 wherein the current flow provided by the current source causes the emitter to generate heat.

6. The apparatus recited in claim 1 wherein the second metal is selected from tungsten, platinum, gold, cadmium, and lead.

7. The apparatus recited in claim 1 wherein the first metal and the third metal comprise an inconel alloy or a steel alloy.

8. The apparatus recited in claim 1 wherein the layer of insulation comprises aluminum oxide or magnesium oxide.

9. The apparatus recited in claim 1 wherein the apparatus is positioned adjacent an interior wall of a core of a nuclear reactor for housing at least fuel rods and coolant for generating heat sufficient to liquefy the coolant.

10. The apparatus recited in claim 9 wherein there are a plurality of apparatuses positioned in axial alignment along the length of the core for measuring the relative power distribution in the core.

11. The apparatus recited in claim 9 wherein there are a plurality of apparatuses positioned circumferentially around the interior of the core.

12. The apparatus recited in claim 11 wherein there are a plurality of apparatuses positioned in axial alignment along the length of the core for measuring the relative power distribution in the core.

13. The apparatus recited in claim 1 wherein the apparatus is supported on at least one wall of a fuel assembly cell of a modular fuel rack.

14. The apparatus recited in claim 13 wherein each wall of the fuel assembly cells of the modular fuel rack supports one apparatus.

* * * * *